United States Patent

Schellenberg

[15] 3,652,802

[45] Mar. 28, 1972

[54] METHOD OF TRANSMITTING DATA OVER A PCM COMMUNICATION SYSTEM

[72] Inventor: Arnold Albert Schellenberg, Wettswil, Switzerland

[73] Assignee: International Standard Electric Corporation, New York, N.Y.

[22] Filed: Nov. 14, 1969

[21] Appl. No.: 876,645

[30] Foreign Application Priority Data

Dec. 11, 1968 Switzerland ........................ 18449/68

[52] U.S. Cl. ........................................................ 179/15 BS
[51] Int. Cl. ........................................................ H04j 3/06
[58] Field of Search ................ 178/69.5; 179/15 BA, 15 BY, 179/15 BS, 15 BW, 15 BV; 340/347 DD

[56] References Cited

UNITED STATES PATENTS

| | | | |
|---|---|---|---|
| 3,302,193 | 1/1967 | Sipress | 340/347 DD |
| 3,461,245 | 8/1969 | Johannes | 179/15 BS |
| 3,504,287 | 3/1970 | Deregnaucourt | 179/15 BA |

*Primary Examiner*—Ralph D. Blakeslee
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

Either one data channel having a high data rate, or several data channels of the same or mixed lower data rate or rates are transmitted in a channel of a TDM-PCM system having a high data rate. The data transmission is performed in synchronism with the PCM system. This is accomplished by having the data frame of the lower data rates related by a multiple to the PCM frame and by adding bits to the data code words to cause equality between the bits of the data code words and the bits of the PCM code words. Further the data is stored in a buffer store, where the bit addition is accomplished, and is read out continuously in the proper channel time slot of the PCM system. To protect against false data frame synchronization due to data code words simulating the data frame synchronization signal, the added bits of certain of the data code words are employed to form a data frame synchronization code word. It is taught herein that conversion from binary coded bits to binary coded ternary code words provides an advantage in transmission of data in a PCM system.

6 Claims, 7 Drawing Figures

INVENTOR
ARNOLD A. SCHELLENBERG
BY Alfred C. Hill
AGENT

INVENTOR
ARNOLD A. SCHELLENBERG
BY Alfred C. Hill
AGENT

INVENTOR
ARNOLD A. SCHELLENBERG
BY Alfred C. Hill
AGENT

INVENTOR
ARNOLD A. SCHELLENBERG
BY Alfred C. Hill
AGENT

INVENTOR
ARNOLD A. SCHELLENBERG
BY Alfred C. Hill
AGENT

METHOD OF TRANSMITTING DATA OVER A PCM COMMUNICATION SYSTEM

BACKGROUND OF THE INVENTION

The present invention relates to TDM (time division multiplex)-PCM pulse code modulation communication systems and more particularly to a method of transmitting data over a channel of a TDM-PCM communication system having a predetermined PCM frame repetition frequency and PCM code words of a given number of bits.

An information rate of 40 to 60 kbit/sec. can be transmitted over a TDM-PCM channel whereas over a channel of a frequency multiplex system an information rate of not more than 2.4 kbit/sec. can be transmitted.

Data systems are known requiring an information rate of 40.8 kbit/sec. or 48 kbit/sec. A large number of data frequency only an information rate of 0.6, 1.2, 2.4 or 4.8 kbit/sec. It is, therefore, desirable to provide a method for data transmission by which either one data channel of a large information rate or several data channels of a smaller information rate can be transmitted over one PCM transmission channel, and where it would also be possible to mix data channels of different information rates.

In connection with PCM systems, several solutions have been proposed for the asynchronous transmission of data. These solutions enable the asynchronous transmission of a data channel of 22 to 50 kbit/sec. over a PCM transmission channel, but no arrangements are provided for transmitting several slow data channels of 0.3 to 4.8 kbit/sec. instead of said high speed data channel.

In connection with data processing systems, arrangements are provided to interconnect several low speed data channels to one of higher transmission capability. These arrangements use a computer for the interconnection and are not qualified for application where either a computer is not available, or the high load impedance makes it impossible to use a computer.

SUMMARY OF THE INVENTION

It is, therefore, an object of the present invention to provide a method and an arrangement for data transmission over a PCM communication system avoiding the above mentioned disadvantages.

A feature of the present invention is the provision of a method of transmitting data over at least one channel of a TDM-PCM communication system having a predetermined PCM frame repetition frequency and PCM code words of a given number of bits comprising the steps of: receiving data including a plurality of channel data code words having a data frame repetition frequency predeterminedly related to the PCM frame repetition frequency and each of the data code words having a number of bits less than the given number of bits; adding extra bits to each of the data code words to modify each of the data code words so that the number of bits thereof equal the given number of bits; utilizing certain ones of the bits of the modified data code words to provide a data frame synchronization signal as a portion of the modified data code words; transmitting continuously the modified data code words on the one channel of the PCM system to a remote PCM terminal; extracting continuously the extra bits and the data frame synchronization signal from the modified data code words at the remote PCM terminal; and recovering at the remote PCM terminal the data code words under control of the extracted data frame synchronization signal for proper utilization of the data code words.

Another feature of the present invention is the provision of employing the above method where the above step of utilizing includes the step of employing certain ones of the extra bits to provide the data frame synchronization signal.

Still another feature of the present invention is the provision of a system for carrying out the above method comprising, at the transmitting end, a data multiplexer, storage means and logic switching means in order to form from the data bits data words suitable for transmission over the PCM system and to adjust the time position of the data words with respect to the PCM code words; and, at the receiving end, storage means, logic switching means and a data demultiplexer in order to bring the data bits after transmission into the time position and form required for the data processing thereof.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENTS

Figure 1:
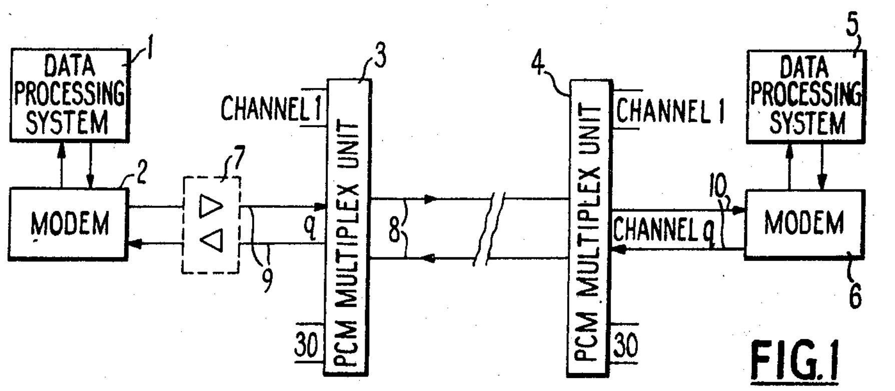
FIG. 1 is a block diagram of a data transmission system in accordance with the principles of this invention using permanently connected PCM transmission lines.

FIG. 1 is a block diagram of an embodiment of a data transmission network using permanently connected PCM transmission lines in accordance with the principles of the present invention. The data to be transmitted is applied from data processing system 1 to modem 2 (a data multiplexer-demultiplex) where the data is converted into the form required for transmission over a PCM communication system. The modified data is propagated on transmission line 9 and, if required, through regenerative repeater 7, to the input of the channel $q$ of a PCM multiplex unit 3 (PCM multiplexer-demultiplexer). From unit 3 the data is transmitted in time multiplex with other data signals or coded speech samples over a PCM transmission line 8 and via regenerative repeaters (not shown) to the remote PCM multiplex unit 4 (PCM multiplexer-demultiplexer). The data appearing at the output of the channel $q$ of multiplex unit 4 are propagated via transmission line 10 to modem 6 (a data multiplexer-demultiplexer) where they are demultiplexed and applied to data processing system 5. The data transmission from data processing system 5 to data processing system 1 is performed in the same manner. If the data transmission from modem 2 or 6 to PCM multiplex unit 3 or 4, respectively, is performed in a continuous flow a substantially smaller bandwidth is required for transmission lines 9 or 10 than for the PCM transmission line 8. Assuming a data rate of 48 kbit/sec., transmission lines 9 and 10 do not have to transmit more than 64 kbit/sec., whereas, assuming a PCM system having 32 channels per frame and eight bits per channel, an information rate of 2.048 Mbit/sec. is transmitted over PCM transmission line 8. For this reason the distance between the repeaters of the data transmission lines 9 and 10 can be much larger than the distance between the repeaters of the PCM transmission line 8.

Figures 2, 3:
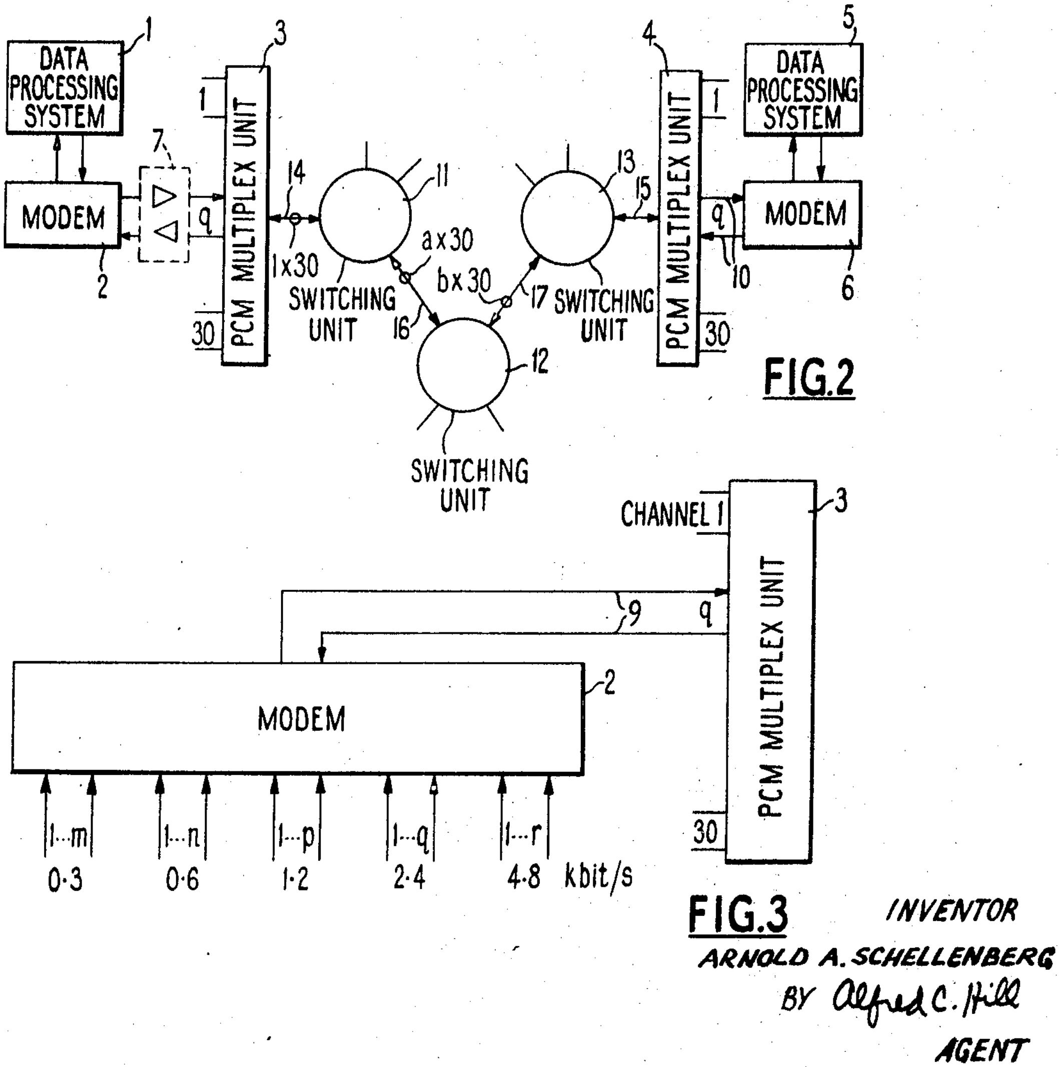
FIG. 2 is a block diagram of a data transmission system in accordance with the principles of this invention using switch PCM transmission lines (switched network)
FIG. 3 is a block diagram for the interconnection of several data channels of mixed information rates in accordance with the principles of this invention.

FIG. 2 is a block diagram of an embodiment of a data transmission network using switching PCM transmission lines, i.e., a switched network. The same parts are indicated by the same references as in FIG. 1. The difference in this embodiment relative to the embodiment of FIG. 1 is that PCM multiplex units 3 and 4, used for the data transmission between the data processing systems 1 and 5, are no longer connected by a fixed PCM transmission line. Rather multiplex unit 3 is connected over a PCM transmission line 14 having e.g., 30 information channels, to a switching unit 11 to which other multiplex units are connected. Switching unit 11 is connected via PCM line 16 having $a \times 30$ information channels to a further switching unit 12 which is connected in turn via PCM line 17 having $b \times 30$ channels to a third switching unit 13, where $a$ and $b$ equal a predetermined fraction. The PCM multiplex unit 4 is connected to switching unit 13 via a PCM line 15. The output $q$ of the multiplex unit 4 is connected via a data transmission line 10 to data modem 6 which is connected in turn to data processing system 5.

FIG. 3 illustrates that instead of a single data processing system having an information rate of, for instance, 48 kbit/sec., several data processing systems having a smaller information rate can be connected to data modem 2. In the present case, it is possible to connect without having regard to the synchronization:

$m$ channels having an information flow of 0.3 kbit/sec. $0 \leq m \leq 160$ and/or $n$ channels having an information flow of 0.6 kbit/sec. $0 \leq n \leq 80$ and/or $p$ channels having an information flow of 1.2 kbit/sec. $0 \leq p \leq 40$ and/or $q$ channels having an information flow of 2.4 kbit/sec. $0 \leq q \leq 20$ and/or $r$ channels having an information flow of 4.8 kbit/sec. $0 \leq r \leq 10$ or 1 channel having an information flow of 48 kbit/sec., synchronizing where $0.3m + 0.6n + 1.2p + 2.4q + 4.8r \leq 48$. As long as this condition is fulfilled, the whole possible PCM information rate can be subdivided randomly into channels of smaller information rate. Also a mixed subdivision is possible, e.g., $m=12 + n=8 + p=7 + q=7 + r=3$. Thus, the system is easily modified to meet different conditions and it is possible, for nearly all cases, to utilize completely the available PCM transmission rate.

For the subdivision of the available PCM transmission capability into several channels of smaller capability and for the time multiplex operation mode of the data multiplexer and demultiplexer resulting therefrom, the identification of a frame is absolutely required. This frame will be referred to as the data frame in the following description to distinguish it from the PCM frame of the PCM transmission path. A data frame synchronizing signal must be transmitted in a certain position within the data frame in order to allow the correct subdivision and allocation (demultiplexing) of the different data channels at the remote end of the PCM transmission path.

For a data transmission in synchronism with the intelligence transmission over the PCM system, the data frame must be an integer multiple of the PCM frame. The duration of the data frame is given by the smallest common integer multiple between the longest time duration for a data bit occurring for a given subdivision of the PCM channel capability and the duration of the PCM frame. In a preferred embodiment of the subdivision with six data bits being transmitted per PCM channel, a minimum duration of the data frame of 5 msec. results for a subdivision into channels with 0.6 kbit/sec. and a minimum duration of 10 msec. for a subdivision into channels with 0.3 kbit/sec.

As already mentioned a data frame synchronizing signal must be transmitted. There are two different possibilities for placing said synchronizing signal within the data frame. With the first possibility the synchronizing word is transmitted in place of a data word, while, with the second possibility, the synchronizing word is formed by the surplus bits of several successive data words. Surplus bits result from the fact that the data words have five, six or seven bits while the PCM system can transmit code words with eight or 10 bits. The reasons for the fact that the whole available information rate over the PCM system is not used for the data transmission will be given later.

Different characteristics of a data transmission system are given in table I below where the synchronization of the data frame is performed using a whole data code word for the frame synchronization signal. The already mentioned subdivision of the information rate into channels of $4.8/2^n$ kbit/sec., where $0 \leq n \leq 4$, is assumed as given and independent of the fact that the PCM information rate can be 40 kbit/sec., 48 kbit/sec., or 56 kbit/sec.

TABLE I

| Information rate (K bit/s.) | | | 40 | 48 | 56 |
|---|---|---|---|---|---|
| Bits per PCM channel | | | 5 | 6 | 7 |
| Time per data bit (μs.) | | | 25 | 20.833. . | 17.857. . |
| Channels | Sample operations/ channel and frame | | | | |
| | 5 ms. | 10 ms. | | | |
| 4.8K bit/s | 24 | 48 | 8 | 9 | 11 |
| 2.4K bit/s | 12 | 24 | 16 | 18 | 22 |
| 1.2K bit/s | 6 | 12 | 32 | 36 | 44 |
| 0.6K bit/s | 3 | 6 | 64 | 72 | 88 |
| 0.3K bit/s | | 3 | 128 | 144 | 72 |
| Time equalization factor | | | $\frac{25}{24}$ | $\frac{10}{9}$ | $\frac{35}{33}$ |
| Number of bits/5 ms.-frame: | | | | | |
| Data bits per frame | | | 200 | 240 | 280 |
| Synchronization bits | | | 5 | 6 | 7 |
| Remainder bits | | | 3 | 18 | 9 |
| Number of bits/10 ms.-frame: | | | | | |
| Data bits per frame | | | 400 | 480 | 560 |
| Synchronization bits | | | 5 | 6 | 7 |
| Remainder bits | | | 11 | 42 | 25 |

Since the synchronization code word is in the place of a data code word, assuming that the two code words have the same number of bits, i.e., five, six or seven bits, dependent on the PCM information rate, only nine channels can be utilized with a subdivision of the information rate of, e.g., 48 kbit/sec., into channels of 4.8 kbit/sec., since the 10 channel is not completely available due to the bits used for the synchronization code word. Thus, a pure data information rate of 43.2 kbit/sec. is transmitted for a total information rate of 48 kbit/sec. The missing 4.8 kbit/sec. give 24 bits per frame with a data frame of 5 msec. 6 bits from said 24 bits are used for the synchronizing code word so that 18 remainder bits per frame result.

As shown in table I 240 bits per data frame of 5 msec. are transmitted. Thus, 216 bits are pure data information, six bits are used for the synchronizing code word and 18 bits are inserted as remainder bits. Since the data bits of the nine data channels, each one of 4.8 kbit/sec., arrive continuously, a time equalization across the data frame must be performed. In this embodiment, the time equalization factor is $48.0/43.2 = 10/9$.

With a subdivision into channels having a smaller information rate, it is evident that 4.8 kbit/sec. would no longer have to be reserved for the synchronization, since only 1.2 kbit/sec. are used for the synchronization, where six bits are used for the synchronization of the data frame of 5 msec. If this latter fact were utilized, this would result in (1) the circuits for the distribution of the clock signals becoming more complicated and (2) channels of different information rate cannot be interconnected without further complications.

It can be seen from table I that smaller time equalization factors result for an information rate of 40 kbit/sec. or 56 kbit/sec., since neither 40 nor 56 can be divided by 4.8 without remainder so that the remainder can be used for the synchronization.

A data frame of 10 msec. must be used for a subdivision of the total PCM information rate into channels of 0.3 kbit/sec. By using six bits for the synchronization code word, an information flow of 0.6 kbit/sec. results for the synchronization code word. For a complete utilization of the available PCM information rate still other factors would result for the time equalization. It is desirable for a universal application and subdivision possibility of the channels, that for each subdivision the same time equalization factor is used at the expense of a slight loss of available PCM information rate.

Since the data frame synchronizing signal is used for a correct synchronous operation of the data multiplexer and demultiplexer, it is clear that by using only one data channel of, e.g., 48 kbit/sec., no data frame or data synchronizing signal is required, since in this case the PCM frame synchronizing signal serves for the correct allocation of the PCM channel used for data transmission to the data processing system.

Since it is, in principle, possible in data transmission when code words are transmitted continuously to simulate the PCM synchronizing signal and produce a false synchronization and, thus, a desynchronization of the PCM system can result, the data code words must be identified. This identification can be provided if not all the bits of a code word are used for data transmission. Thus, for instance, the surplus (extra) bits of data code words can be used for such an identification to render them different, unambiguously, from the PCM code words. By transmitting at least one of the surplus bits as "1," it can be provided that code words having all their bits "0" never go to the PCM line. This is especially of importance when several adjacent channels of a PCM system are used for data transmission, since upon the accidental presence of several successive code words having all their bits "0," the synchronization of the regenerative repeaters is disturbed. The systematic inversion of predetermined bits of a code word, as used for speech transmission, is not possible for data transmission, since data code words can occur giving after the inversion, code words having all their bits "0." It is also possible for speech transmission that, after the inversion; code words occur having all their bits "0" but the probability that this same configuration of the code words occurs simultaneously in several adjacent channels is extremely low.

It is obvious to use the surplus bits not used for data transmission for the synchronization of the data frame. Table II shows different characteristics of a data transmission system using this manner of frame synchronization. Since the subdivision of the total PCM information rate should be made into channels having an information rate of $4.8/2^n$ kbit/sec., where $0 \leq n \leq 4$, the use of six bits per PCM channel is very interesting, since the subdivision of the PCM information rate into smaller channels can be made without remainder. Since the synchronization of the data frame requires no additional bits a factor of unity results for the time equalization.

TABLE II

| Information flow (K bit/s.) | | | 40 | 48 | 56 |
|---|---|---|---|---|---|
| Bits per PCM channel | | | 5 | 7 | 7 |
| Time per data bit (µs.) | | | 25 | 20.833. . | 17.957. . |
| Channels | Sample operations/ channel and frame | | | | |
| | 5 ms. | 10 ms. | | | |
| 4.8K bit/s. | 24 | 48 | 8 | 10 | 11 |
| 2.4K bit/s. | 12 | 24 | 16 | 20 | 22 |
| 1.2K bit/s. | 6 | 12 | 32 | 40 | 44 |
| 0.6K bit/s. | 3 | 6 | 64 | 80 | 88 |
| 0.3K bit/s. | | 3 | 128 | 160 | 172 |
| Time equalization factor | | | 25/24 | 1 | 35/33 |
| Number of bits/5 ms.-frame: | | | | | |
| Data bits per frame | | | 200 | 240 | 280 |
| Synchronization bits | | | 5 | 6 | 7 |
| Remainder bits | | | 8 | 0 | 16 |
| Number of bits/10 ms.-frame: | | | | | |
| Data bits per frame | | | 400 | 480 | 560 |
| Synchronization bits | | | 5 | 6 | 7 |
| Remainder bits | | | 16 | 0 | 32 |

In the preceding explanation five, six or seven bits per PCM channel are mentioned. The bits were assumed to be binary bits. The data transmission can also be performed in a ternary code along the whole transmission path or a portion thereof. A data transmission in a ternary code is especially, but not exclusively, interesting if the PCM system used for the data transmission operates with a ternary code. However, the ternary bits are not transmitted over long distances in this form, but in a binary coded form, so that the known binary coded ternary code results which is very well adapted for the transmission due to its substantial absence of DC components. Since $2^6 = 64$ different conditions can be expressed by a code word of six binary bits, but $3^4 = 81$ different conditions can be expressed by a code word of four ternary bits, a conversion of code words of six binary bits into code words of four ternary bits can be performed without further consequences. A conversion from four ternary bit code words to six binary bit code words is also possible as long as only 64 of the 81 possible conditions are utilized. For the transmission, each ternary bit is expressed by two binary bits.

Many internationally normalized PCM transmission systems, (CCITT, CEPT) working in the binary code use code words of eight bits, i.e., eight bits per PCM channel. If data code words of five or six or seven bits, respectively, are used for data transmission over the PCM system, three or two or one surplus bits, respectively, result. By using three or two surplus bits per data code word, the synchronization of the data frame can be performed safely while one bit per data code word is insufficient. Therefore, with 56 kbit/sec. (seven-bit-code words), the data frame synchronization must be performed with the aid of a synchronization code word which is transmitted in place of data information.

PCM systems working with the ternary code use code words of five ternary bits. As already mentioned four ternary bits are used for data transmission, thus, eight bits with a binary coding. For synchronization purposes two binary bits can be used.

The form of the data frame signal will now be examined both for a data transmission system working according to the indications of table I, i.e., the data synchronizing word is transmitted in place of a data word, and for a data transmission system working according to the indications given in table II, i.e., surplus bits are used for the synchronizing word. This examination will be made with regard to both binary systems and ternary systems. Also, the requirement that the data frame synchronizing signal should not be simulated accidentally, i.e., it must differ from the data signals in an unambiguous manner, is maintained. The following possibilities result:

| | |
|---|---|
| (1) Binary system working with 48K bit/s. or less: | |
| X=0 or 1 | a or b |
| Data code word | 11XXXXXX XXXXXX10 |
| Data synchronizing word: | |
| Sync. as per Table I | 01111111 00000001 |
| Sync. as per Table II | 01XXXXXX XXXXXX01 |
| (2) Binary system working with 56K bit/s.: | |
| X=0 or 1 | a or b |
| Data code word | 1XXXXXXX XXXXXXX1 |
| Data synchronizing word: Sync. as per Table I | 01111111 11111110 |
| (3) Ternary system working with 48K bit/s. or less: | |
| XX=10 or 01 or 00* | |
| Data code word | XX XX XX XX 01 |
| Data synchronizing word: | |
| Sync. as per Table I | 00 00 00 01 00* |
| Sync. as per Table II | XX XX XX XX 00 |
| (4) Ternary system working with 56K bit/s.: | |
| XX=10 or 01 or 00* | |
| YZ=01 or 10 | |
| Data code word | XX XX XX XX YZ |
| Data synchronizing word: Sync. as per Table I | 00 00 00 01 00* |

*"00" and "11" is alternately transmitted over the "00" line.

By using a synchronization according to table II with surplus bits, the synchronization can be improved by making a synchronizing code word from the surplus bits of several successive data code words. This leads, for a binary system having its information rate of 48 kbit/sec. subdivided into $n$ channels of smaller information rate, for example, to following data frame format:

| | | | |
|---|---|---|---|
| channel | n : | 11XXXXXX | |
| | 1 : | 01XXXXXX | |
| | 2 : | 11XXXXXX | the extra bits of |
| | 3 : | 01XXXXXX | successive code |
| | 4 : | 01XXXXXX | words provide a |
| | . | | synchronizing code word |
| | 5 : | 11XXXXXX | |
| | . | | |
| | . | | |
| | . | | |
| | n–1 | 11XXXXXX | |

For all other code words, the extra digits will be identical with one another. This measure prevents the loss of the synchronizing signals or the production of a false synchronizing bit by an accidental and false inversion of one of the synchronizing bits or of one of the remainder bits.

In the following description those portions of the system which are used for the data transmission will be described in more details. First, a system will be described using a synchronization according to table I. In this system a synchronizing code word is transmitted each 10 msec., or each 5 msec., if channels of 0.3 kbit/sec. are not present. Since the transmission rate of the data processing systems is not in accordance with the transmission rate of the PCM system, buffer stores are required for the number of remainder bits. The clock frequency must be equalized so that the information is transmitted with a constant rate from and to the data processing systems.

Figure 4:
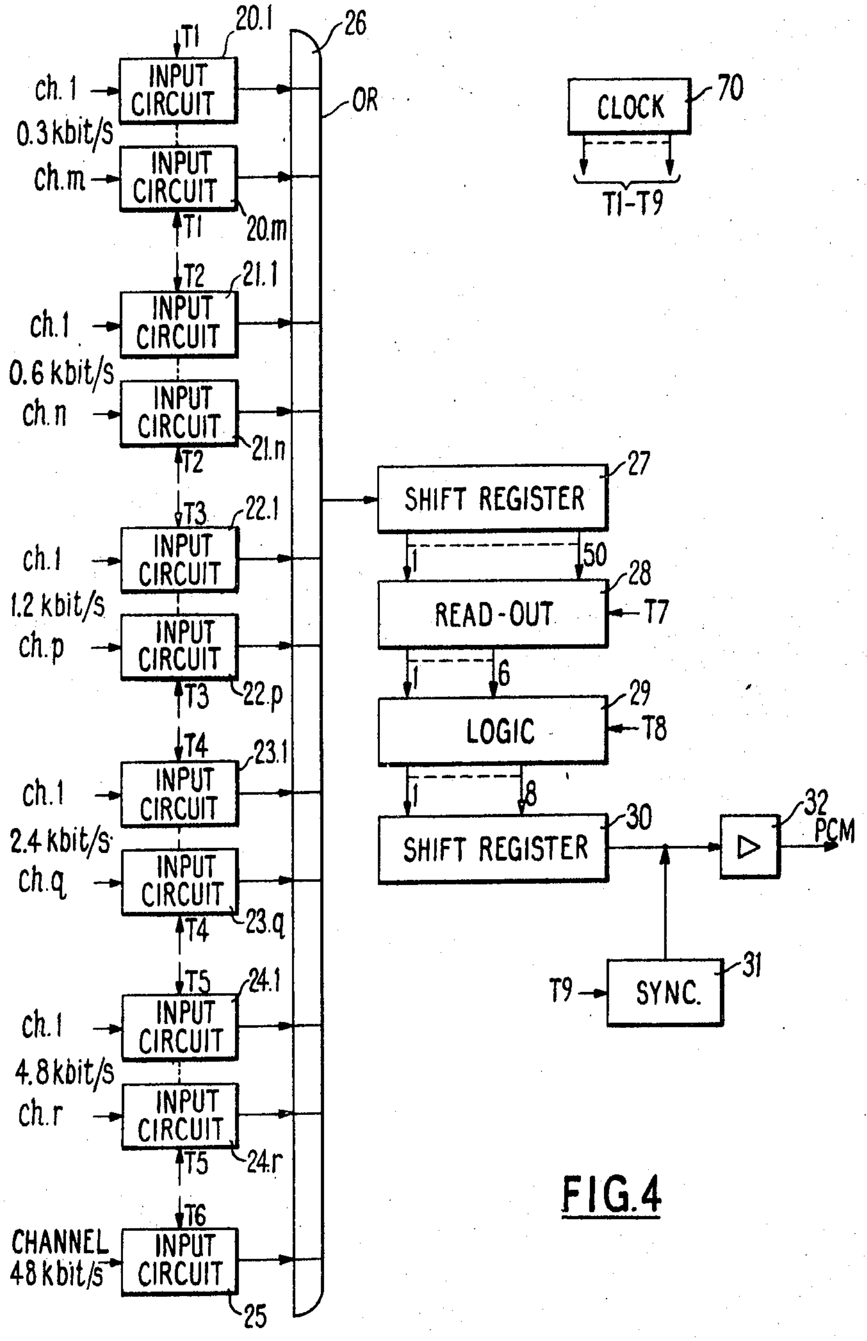
FIG. 4 is a block diagram of data modem 2 of FIGS. 1 and 2 arranged to meet the specifications of table I.

FIG. 4 shows the block diagram of a converter (modem 2, FIGS. 1 and 2) between data processing systems and a PCM terminal. It is assumed that an information rate of 48 kbit/sec., i.e., 6 bits per PCM channel, is used which should be divided into channels of $4.8/2^n$ kbit/sec., where $0 \leq n \leq 4$, so that a duration of 10 msec. for the data frame results. Further, it is assumed that the PCM system used for the data transmission operates with code words of eight bits and that for the synchronization a data word having eight successive bits is used, as indicated in table I, so that a data information rate usable for data transmission of 43.2 kbit/sec. results.

When the system is completely equipped, an input circuit 20–25 is provided for each data channel which can be connected thereto. Obviously, the number and rate of channels allowed to be connected is that number, considering the rate thereof, that will not exceed the total information rate of 43.2 kbit/sec. One exception is when only one channel of 48 kbit/sec. is connected, since, as already mentioned, in this case the data frame signal is not required so that the total information flow can be utilized for data transmission. Each input circuit 20–25 contains an arrangement for the bit synchronization in which the time position of a bit can be shifted by a maximum of one bit in order to achieve the correct time position of the bits with respect to the clock pulses applied to the inputs T1–T6. All clock signal inputs of the entire converter are referenced T1–T9 to indicate that different clock frequencies arise at different points which are derived from the same clock frequency of clock 70, e.g., with the aid of a counter, and matrix decoder, which clock frequency is in turn synchronized with the clock frequency of the PCM system. Each input circuit includes further an AND circuit to which the data bits and the clock signals are applied. The input circuits 20–25 apply their output signals to OR circuit 26. Input circuits 20–25 form together with OR circuit 26 the data multiplexer.

From OR circuit 26, the data bits pass into a 50-bit shift register 27 serving as buffer store due to the necessary time equalization. The bits contained in shift register 27 are read out in parallel form into circuit 28. The six bits belonging to a data word are transferred into logic circuit 29 from circuit 28. Circuit 29 adds the two additional bits to the six bits of the data word in order to obtain a data word of eight bits conforming to the code words used in the PCM system. These eight bits are applied to an output shift register 30 wherefrom the data bits are serially applied to the transmission line to the PCM terminal. In this line regenerative repeater 32 is provided regenerating the pulse form of the data bits and producing output pulses of a desired level. Between output shift register 30 and regenerative repeater 32, circuit 31 is connected delivering, in this case, a data frame synchronizing word of eight bits to the transmission line each 10 msec.

Figure 5:
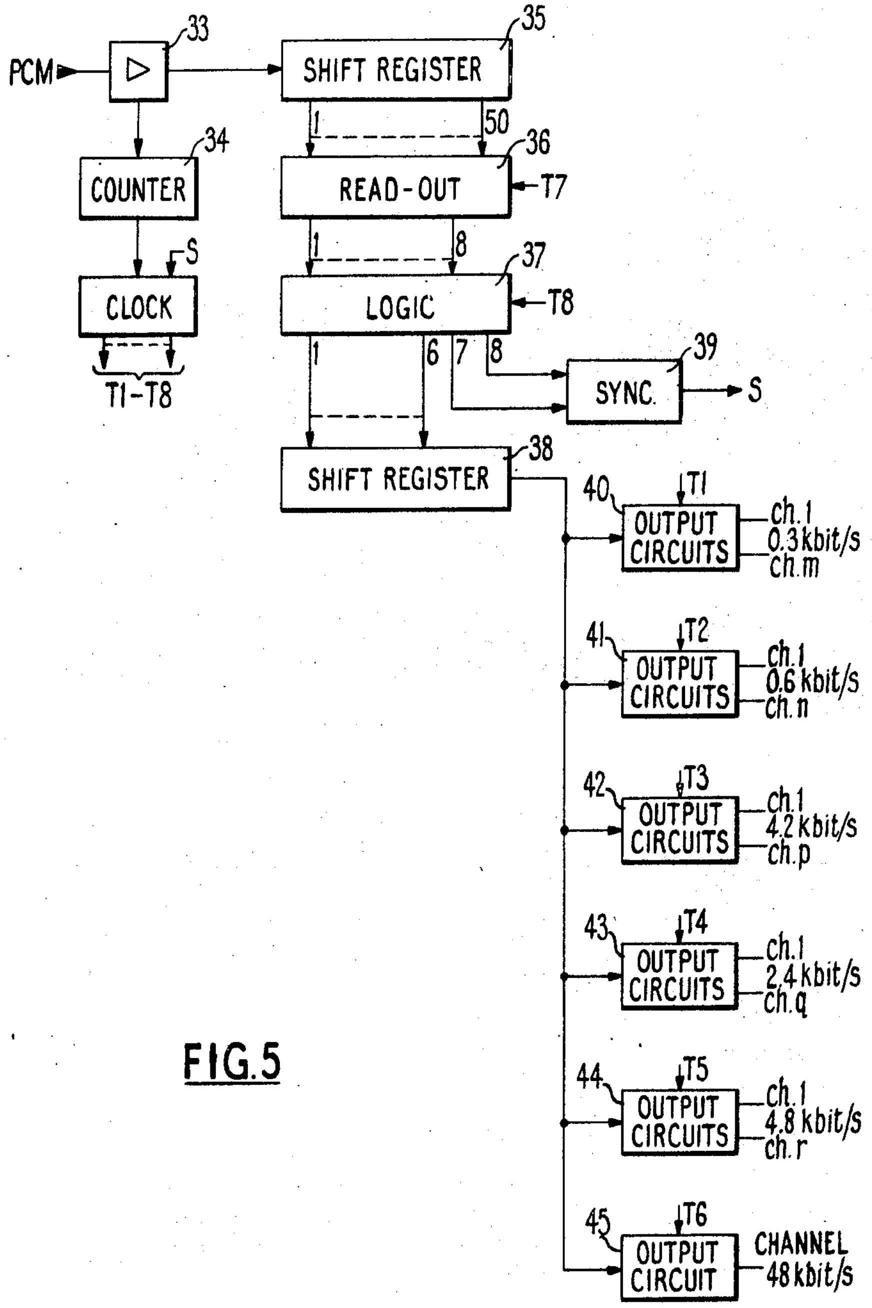
FIG. 5 is a block diagram of data modem 6 of FIGS. 1 and 2 arranged to meet the specifications of table I.

FIG. 5 shows a block diagram of a converter (modem 6, FIGS. 1 and 2) between the PCM terminal and the data processing systems which converter is arranged to cooperate with the converter according to FIG. 4 at the other end of the PCM transmission line. The pulses arriving from the PCM terminal are first reshaped in regenerative amplifier 33 to which a circuit 34 is connected for deriving the clock frequency from the incoming signals. This circuit 34 provides the converter with the required clock frequencies also referenced T1–T9. The incoming data bits are applied to a 50-bit shift register 35 and are read out parallelly into a circuit 36. Data words having eight bits are transferred to a logic circuit 37 within which the two bits added for the transmission are removed and applied to a synchronizing circuit 39 cooperating with the circuit 34. The six remaining bits are applied through shift register 38 to output circuits 40–45 forming the data demultiplexer and providing at their outputs the data bits for the different data processing systems.

Figure 6:
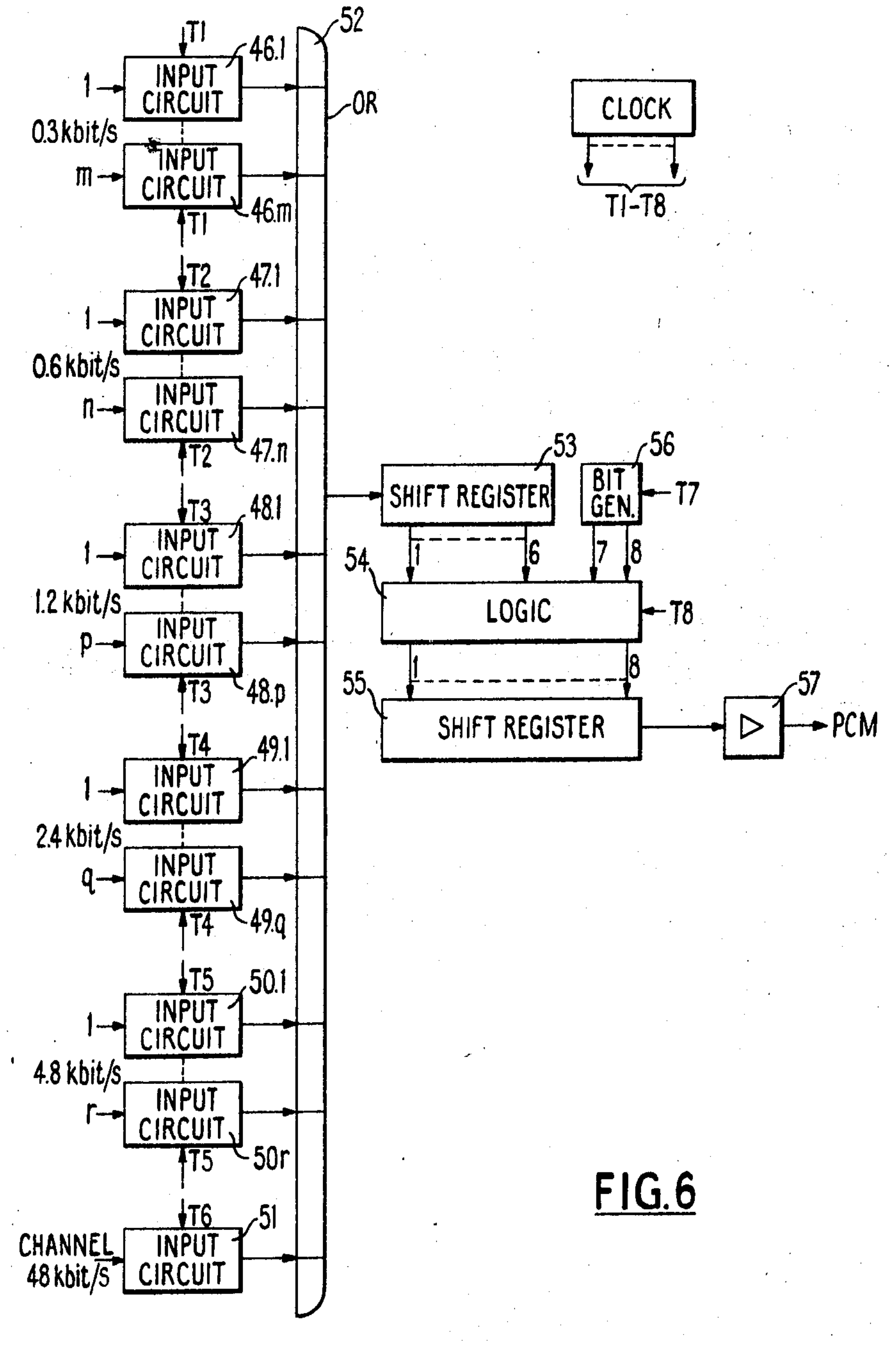
FIG. 6 is a block diagram of data modem 2 of FIGS. 1 and 2 arranged to meet the specifications of table II.

FIG. 6 shows a block diagram of a converter (modem 2, FIGS. 1 and 2) between one or more data processing systems and the PCM terminal. The same assumptions are made as for the converter according to FIG. 4 with the single exception that the two surplus bits are used for synchronizing the data frame which surplus bits result from the fact that the data words have six bits, but the code words of the PCM systems have eight bits.

The input circuits 46–51 have the same structure as the input circuits 20–25 of FIG. 4 and have to allow the equalization over one bit. The output signals of the input circuits pass to OR circuit 52 of identical structure with OR circuit 26. The remainder of the circuit can be simpler than the circuit according to FIG. 4, since in this case the time equalization factor is unity. From OR circuit 52 the signals pass to a six-bit shift register 53, are transferred in parallel into logic circuit 54 within which the two additional bits required for the transmission over the PCM line are added either as fill-up bits or as synchronizing bits, circuit 56 delivering the additional bits. The eight bits are now transferred to an eight-bit shift register 55, from where they are applied via regenerative amplifier 57 through a transmission line to the PCM terminal.

Figure 7:
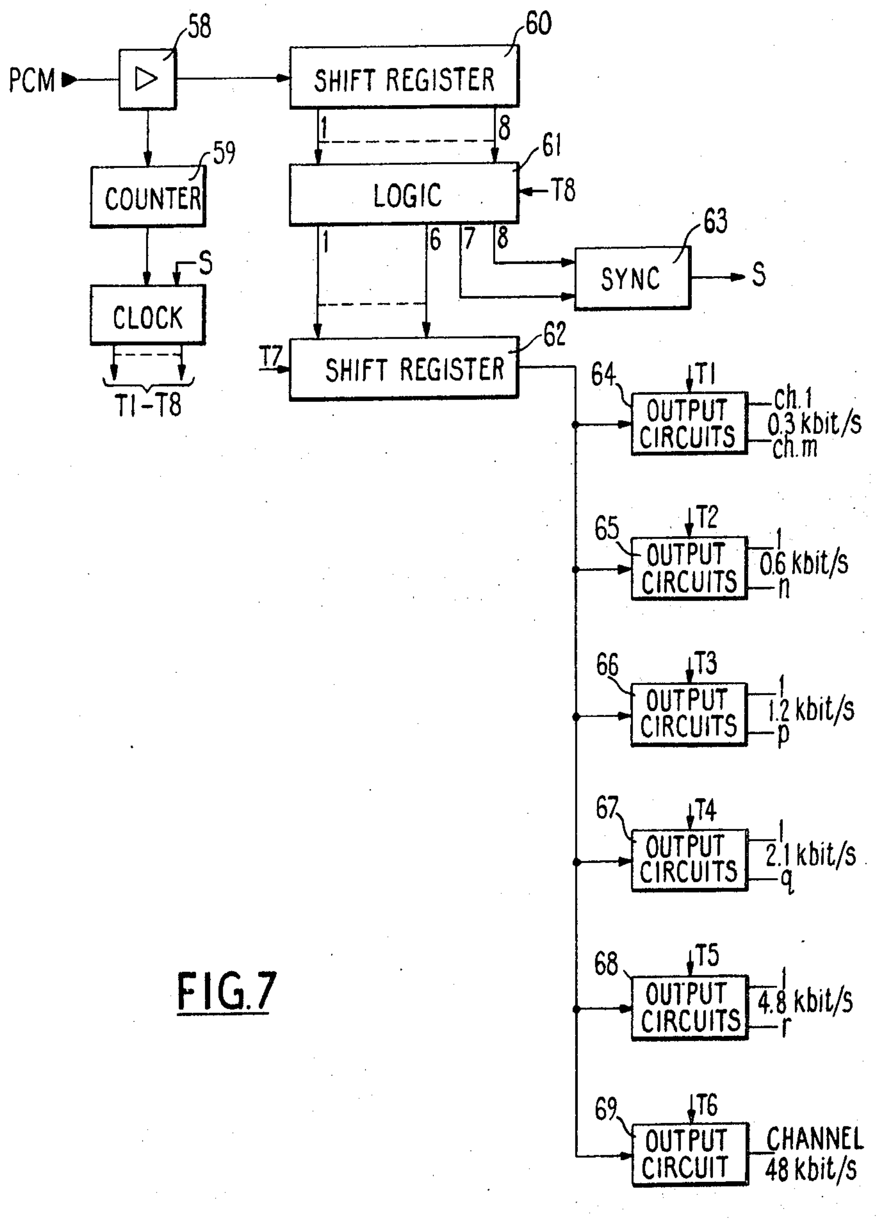
FIG. 7 is a block diagram of data modem 6 of FIGS. 1 and 2 arranged to meet the specifications of table II.

FIG. 7 shows a block diagram of a converter (modem 6, FIGS. 1 and 2) cooperating with the converter according to FIG. 6 and being arranged between the PCM terminal and the data processing systems. This converter is nearly identical with that of FIG. 5, but somewhat simpler, since the circuits required for the time equalization are not present. The signals coming from the PCM terminal are applied via regenerative amplifier 58 to an eight-bit shift register 60. Circuit 59 is connected to regenerative amplifier 58 for deriving clock frequencies for the converter from the clock frequency of the incoming signal. From the shift register 60, the written-in bits are transferred in parallel into logic circuit 61 in which the surplus bits are removed. The synchronizing bits contained in the surplus bits are evaluated in circuit 63 cooperating with circuit 59. The remaining bits are written into output shift register 62 from where they pass to output circuits 64–49 forming the data demultiplexer and separating the incoming signals for the different data channels.

While I have described above the principles of my invention in connection with specific apparatus, it is to be clearly understood that this description is made only by way of example and not as a limitation to the scope of my invention.

I claim:

1. A method of transmitting data over at least one channel of a TDM-PCM communication system having a predetermined PCM frame repetition frequency and PCM code words of a given number of bits comprising the steps of:

receiving said data including a plurality of channel data code words having a data frame repetition frequency predeterminately related to said PCM frame repetition frequency and each of said data code words having a number of bits less than said given number of bits;

adding extra bits to each of said data code words to modify each of said data code words so that the number of bits thereof equal said given number of bits;

utilizing certain ones of bits of said modified data code words to provide a data frame synchronization signal as a portion of said modified data code words;

transmitting continuously said modified data code words on said one channel of said PCM system to a remote PCM terminal;

extracting continuously said extra bits and said data frame synchronization signal from said modified data code words at said remote PCM terminal; and recovering at said remote PCM terminal said data code words under control of said extracted data frame synchronization signal for proper utilization of said data code words;

said step utilizing including the step of employing certain ones of said extra bits of a given number of said modified data code words to provide said data frame synchronization signal in the form of a synchronizing code word; and said step of employing including the steps of selecting said extra bits of a given number of consecutive ones of said modified data code words to provide said data frame synchronization signal in the form of a synchronizing code word, and rendering said extra bits of the others of said modified data code words identical to one another.

2. A method according to claim 1, wherein said step of transmitting includes the steps of storing said data code words, and reading out said stored data code words at a continuous rate equal to the information rate of said one channel of said PCM system.

3. A method according to claim 3, wherein said step of transmitting includes the steps of storing said data code words, and reading out said stored data code words at a continuous rate equal to the information rate of said one channel of said PCM system.

4. A method of transmitting data over at least one channel of a TDM-PCM communication system having a predetermined PCM frame repetition frequency and PCM code words of a given number of bits comprising the steps of:

receiving said data including a plurality of channel data code words having a data frame repetition frequency predeterminately related to said PCM frame repetition frequency and each of said data code words having a number of bits less a than said given number of bits;

adding extra bits to each of said data code words to modify each of said data code words so that the number of bits thereof equal said given number of bits;

utilizing certain ones of bits of said modified data code words to provide a data frame synchronization signal as a portion of said modified data code words;

transmitting continuously said modified data code words on said one channel of said PCM system to a remote PCM terminal;

extracting continuously said extra bits and said data frame synchronization signal from said modified data code words at said remote PCM terminal; and recovering at said remote PCM terminal said data code words under control of said extracted data frame synchronization signal for proper utilization of said data code words;

said step utilizing including the step of employing certain ones of said extra bits of a given number of said modified data code words to provide said data frame synchronization signal in the form of a synchronizing code word; and said step of receiving including accepting said data including a plurality of groups of channel data code words, each of said groups having a different data frame repetition frequency predeterminately related to said PCM frame repetition frequency and the repetition frequency of the others of said groups, each of said data code words having a number of bits less than said given number of bits; and combining said plurality of groups to enable achieving in said step of adding an information rate therefore equal to the information rate of said one channel of said PCM system.

5. A method according to claim 4, wherein said data frame repetition frequency of each of said groups is an integer multiple of said PCM frame repetition frequency and the repetition frequency of the others of said groups.

6. A method according to claim 4, wherein each of said code words contain binary coded bits; and said method further includes the step of converting said binary coded bits into binary coded ternary code words for employment in said step of transmitting.

* * * * *